United States Patent
Nakai et al.

(10) Patent No.: US 11,938,561 B2
(45) Date of Patent: Mar. 26, 2024

(54) LASER PROCESSING APPARATUS

(71) Applicant: Panasonic Intellectual Property Management Co., Ltd., Osaka (JP)

(72) Inventors: Izuru Nakai, Osaka (JP); Takaaki Kassai, Osaka (JP); Takayuki Yoshida, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 17/232,412

(22) Filed: Apr. 16, 2021

(65) Prior Publication Data

US 2021/0346984 A1    Nov. 11, 2021

(30) Foreign Application Priority Data

May 8, 2020    (JP) ................. 2020-082637

(51) Int. Cl.
*B23K 26/0622*    (2014.01)
*B23K 26/064*    (2014.01)
*B23K 26/067*    (2006.01)

(52) U.S. Cl.
CPC ........ *B23K 26/0622* (2015.10); *B23K 26/064* (2015.10); *B23K 26/067* (2013.01)

(58) Field of Classification Search
CPC .. B23K 26/0622; B23K 26/082; B23K 26/40; B23K 26/064; B23K 2101/40; B23K 2103/172; B23K 2103/50; B23K 26/0853; B23K 26/06; B23K 26/0648; B23K 26/0665; B23K 26/067; B23K 26/389; B23K 2103/10; B23K 2103/12;
(Continued)

(56) References Cited

U.S. PATENT DOCUMENTS 6,418,154 B1 * 7/2002 Kneip ................. H01S 3/1312
372/75
8,559,107 B2 * 10/2013 Chann ................. G02B 19/0028
359/556
(Continued)

FOREIGN PATENT DOCUMENTS

JP    2003-048093    2/2003
JP    2003-053579    2/2003
(Continued)

*Primary Examiner* — Chris Q Liu
(74) *Attorney, Agent, or Firm* — Wenderoth, Lind & Ponack, L.L.P.

(57) ABSTRACT

A laser processing apparatus includes a light source configured to emit laser light; a power supply configured to supply a current to the light source; a deflection unit on an optical path of the laser light and including an optical element configured to change an amount of transmission of the laser light to deflect at least a part of the laser light; an optical separation unit on the optical path of the laser light and being configured to shield higher-order light included in the laser light and deflected by the optical element in the deflection unit, and transmit zero-order light that is included in the laser light and passes through the deflection unit; and a signal synchronization unit configured to control the power supply to selectively turn the current on or off in synchronization with a timing at which the higher-order light is deflected by the optical element.

13 Claims, 6 Drawing Sheets

(58) Field of Classification Search
CPC .. B23K 2103/42; B23K 26/04; B23K 26/042; B23K 26/0624; B23K 26/0626; B23K 26/0643; B23K 26/10; B23K 26/361; B23K 26/382; B23K 1/0056; B23K 2101/36; B23K 2101/38; B23K 2103/08; B23K 26/0006; B23K 26/009; B23K 26/02; B23K 26/032; B23K 26/043; B23K 26/0604; B23K 26/0613; B23K 26/0652; B23K 26/0676; B23K 26/0736; B23K 26/08; B23K 26/16; B23K 26/352; B23K 26/364; H01S 3/117; H01S 3/0085; H01S 3/1068; H01S 3/115; H01S 3/005; H01S 3/10038; H01S 3/1306; H01S 3/136; H01S 3/2383; H01S 2301/02; H01S 3/0007; H01S 3/0064; H01S 3/06758; H01S 3/08054; H01S 3/08072; H01S 3/0815; H01S 3/082; H01S 3/083; H01S 3/09415; H01S 3/10; H01S 3/10015; H01S 3/1302; H01S 3/1312; H01S 3/2308; H01S 5/0287; H01S 5/141; H01S 5/3401

USPC .............. 219/121.69, 121.77, 121.6, 121.61, 219/121.62, 121.68, 121.74, 121.76, 219/121.8, 121.81, 121.82, 121.85; 372/25, 10, 26, 30, 105, 106, 12, 33, 372/38.1, 69, 75

See application file for complete search history.

(56) References Cited

U.S. PATENT DOCUMENTS

| | | | |
|---|---|---|---|
| 2005/0270631 A1* | 12/2005 | Johnson | B23K 26/0665 |
| | | | 359/305 |
| 2008/0181269 A1 | 7/2008 | Osako et al. | |
| 2018/0031948 A1* | 2/2018 | Bellos | B23K 26/02 |
| 2018/0173027 A1* | 6/2018 | Morse | G02F 1/113 |
| 2018/0254603 A1* | 9/2018 | Patel | H01S 5/141 |
| 2019/0099839 A1* | 4/2019 | Nomaru | H01S 3/10061 |
| 2019/0363518 A1 | 11/2019 | Zhou et al. | |
| 2020/0061740 A1* | 2/2020 | Okuma | B23K 26/067 |

FOREIGN PATENT DOCUMENTS

| | | |
|---|---|---|
| JP | 2014-172062 | 9/2014 |
| JP | 5638054 B | 12/2014 |

* cited by examiner

LASER PROCESSING APPARATUS

BACKGROUND

1. Technical Field

The present disclosure relates to a laser processing apparatus.

2. Description of the Related Art

In a processing technique using laser light, processing using a pulse laser beam may be required in addition to processing using a continuous laser beam. The processing using the pulse laser beam is used, for example, when it is desirable to suppress a thermal effect on an object to be processed and to perform highly accurate processing.

For example, Japanese Patent No. 5638054 discloses that a continuous wave (CW) or quasi-CW laser beam is used as a laser beam by generating a laser pulse sequence by using an optical shutter.

Figure 7:
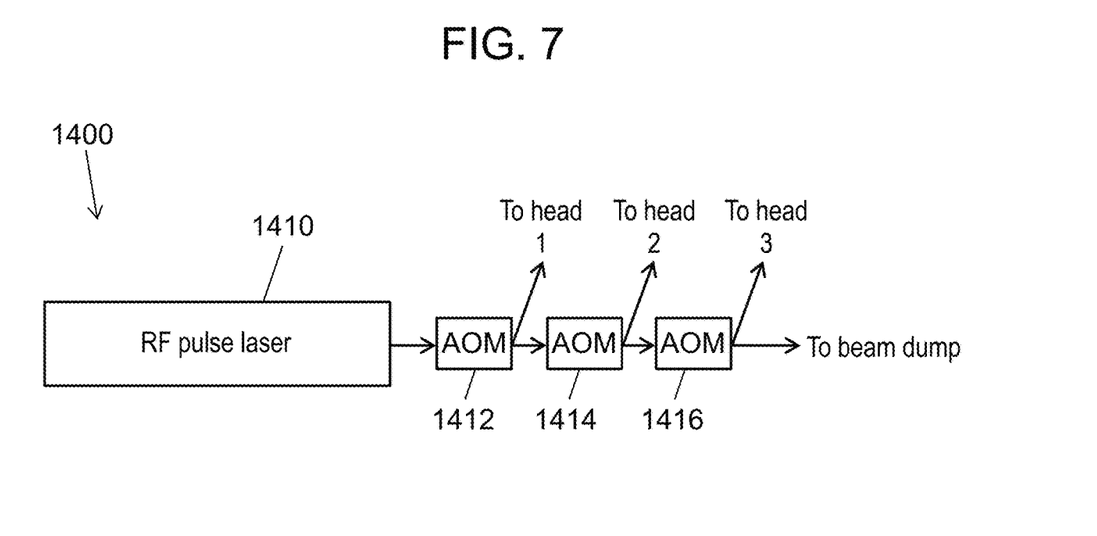
FIG. 7 is a schematic diagram of a pulse sequence generation method of the related art.

FIG. 7 illustrates system 1400 that generates a plurality of beams from single radio frequency (RF) pulse laser described in Japanese Patent No. 5638054. In FIG. 7, RF pulse laser 1410 generates a laser beam, and the laser beam passes through acousto-optic modulators (AOMs) 1412, 1414, and 1416 arranged in series. System 1400 can generate temporal intra-pulse slices by using AOMs 1412, 1414, and 1416 and distribute a laser beam to each path towards a processing head in order to provide a plurality of beams.

SUMMARY

According to one aspect of the present disclosure, a laser processing apparatus includes a light source including a laser oscillator that emits laser light; a power supply that supplies a current to the light source; a deflection unit that is provided on an optical path of the laser light emitted from the light source and includes an optical element that changes an amount of transmission of the laser light to deflect at least a part of the laser light; an optical separation unit that is provided on the optical path of the laser light passing through the deflection unit, shields higher-order light that is included in the laser light and deflected by the optical element in the deflection unit, and transmits zero-order light that is included in the laser light and passes through the deflection unit; and a signal synchronization unit that controls or selectively turns on or off the current in synchronization with a timing at which the higher-order light is deflected by the optical element.

DETAILED DESCRIPTION

A recent laser processing apparatus often uses a wavelength beam combining (WBC) type DDL oscillator in order to enable a high-power output.

In this regard, in a laser processing apparatus described in Japanese Patent No. 5638054, output light of an RF pulse laser is pulsed to deflect higher-order light of a laser beam and guided to a processing head by using a diffraction phenomenon by an AOM. A deflection angle of the laser beam at this time is different for each wavelength of the laser beam. Therefore, when the WBC type DDL oscillator is adopted in the laser processing apparatus described in Japanese Patent No. 5638054 that uses the deflected higher-order light for processing, the laser light diffracted by the AOM spreads, and even when light is condensed, a spot shape is likely to be distorted.

Meanwhile, when laser processing is performed by using a pulse laser, a waveform of the pulse laser is directly linked to processing accuracy, and thus, in the related art such as Japanese Patent No. 5638054, a more appropriate control method for a waveform of a pulse laser is not reviewed, and there is room for improvement in terms of increasing processing accuracy.

The present disclosure is made in view of the above problems, and an object of the present disclosure is to provide a laser processing apparatus having excellent processing accuracy.

Hereinafter, the present disclosure will be described with reference to the drawings.

Figure 1:
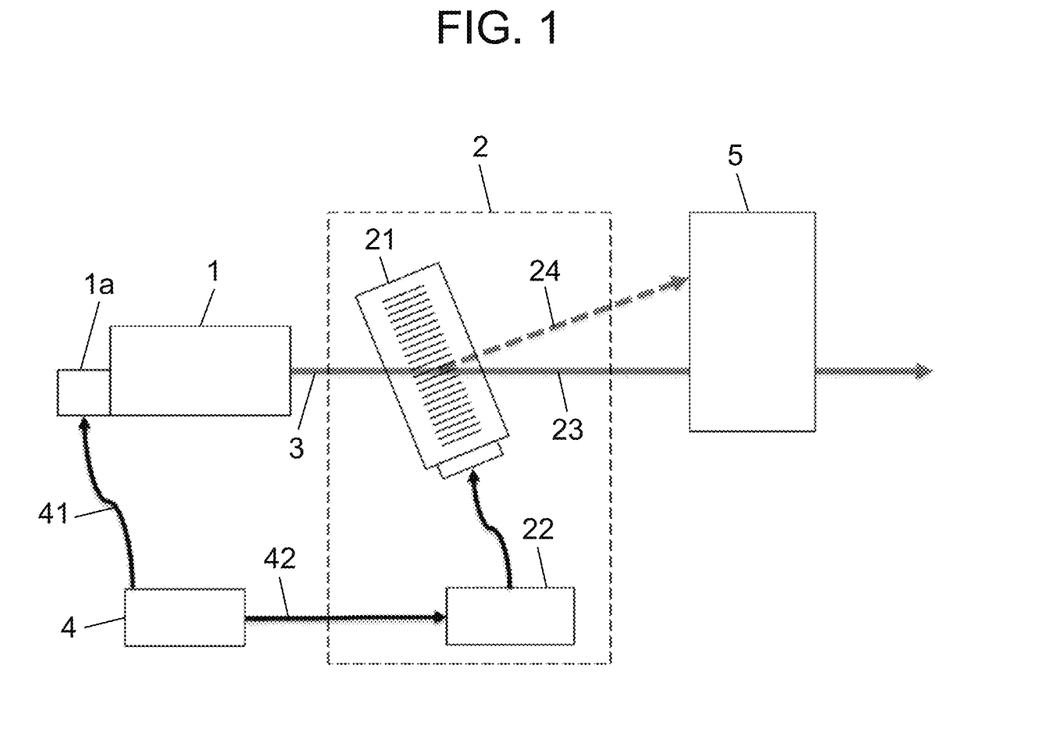
FIG. 1 is a schematic view of a laser processing apparatus according to an exemplary embodiment of the present disclosure.

A laser processing apparatus of the present disclosure has light source 1, power supply 1a, deflection unit 2, optical separation unit 5, and signal synchronization unit 4 (see FIG. 1).

Light source 1 includes a laser oscillator that emits laser light 3. Power supply 1a supplies a current to light source 1. Deflection unit 2 includes optical element 21 that changes the amount of transmission of laser light 3. Optical separation unit 5 shields higher-order light deflected by deflection unit 2 and causes the zero-order light to transmit optical separation unit 5. Signal synchronization unit 4 controls a current supplied from power supply 1a to light source 1 in synchronization with a timing at which laser light 3 is deflected by optical element 21.

The laser processing apparatus of the present disclosure uses zero-order light for processing by shielding higher-order light deflected by deflection unit 2 and causing the zero-order light to transmit. Further, since a current supplied from power supply 1a to light source 1 in synchronization with timing at which laser light 3 is deflected by optical element 21, signal synchronization unit 4 can adjust rising timing and falling timing of a current of power supply 1a and timing of transmission of laser light 3 by optical element 21.

According to the laser processing apparatus of the present disclosure, it is possible to realize laser processing with high processing accuracy. In addition, it is possible to suppress current loss and decrease in efficiency during rising and falling of an optical output.

Exemplary Embodiment 1

FIG. 1 is a schematic view of the laser processing apparatus according to the present exemplary embodiment.

The laser processing apparatus has light source 1. Light source 1 includes a laser oscillator. For example, in order to enable high power output, the laser oscillator may have a structure in which laser lights of different wavelengths emitted from a plurality of direct diode lasers (DDL) are collimated by using an optical shaping unit, the collimated lights are synthesized by using a synthesizing unit, and the synthesized light is condensed by using a condensing unit. That is, a wavelength beam combining (WBC) type laser oscillator may be used as the laser oscillator. Light source 1 emits laser light 3. Laser light 3 may be superimposed laser light in which laser lights of a plurality of different wavelengths is superimposed.

The laser processing apparatus has power supply 1a. Power supply 1a supplies a current to light source 1. By modulating a current supplied from power supply 1a, the laser oscillator can oscillate continuous CW laser light and laser light of a pulse shape.

The laser processing apparatus has deflection unit 2 provided on an optical path of laser light 3 emitted from light source 1. Deflection unit 2 includes optical element 21 that changes the amount of transmitted laser light. Optical element 21 is preferably an acousto-optic element (hereinafter, also referred to as an AOM). In the present exemplary embodiment, deflection unit 2 includes AOM 21 and AOM driver 22. AOM 21 branches laser light 3 into diffracted light 24 and zero-order light 23 according to turn-on or turn-off of a signal of AOM driver 22.

Figure 2A:
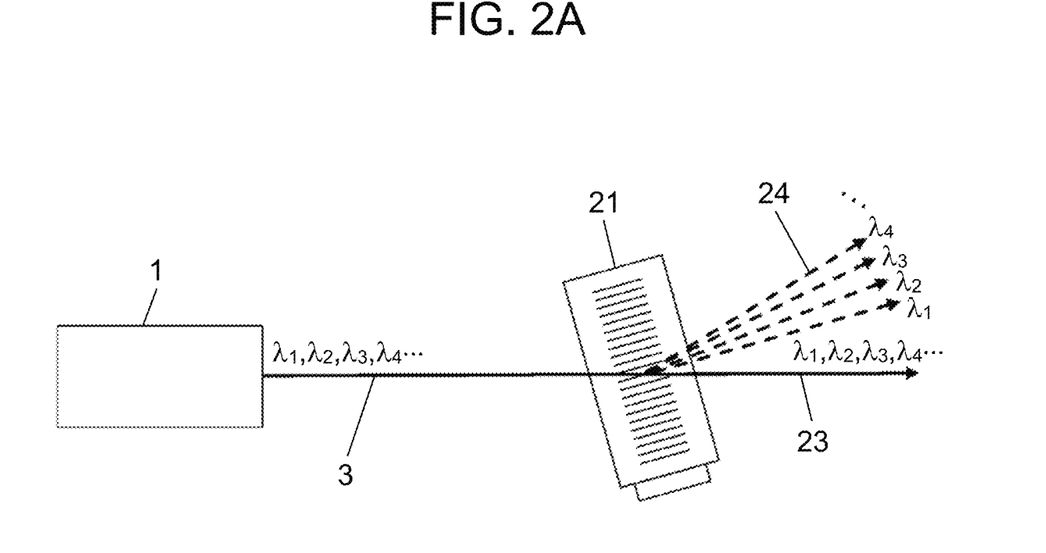
FIG. 2A is a schematic view illustrating laser light and diffracted light according to an exemplary embodiment of the present disclosure.

FIG. 2A illustrates how laser light 3 of the laser processing apparatus according to the present exemplary embodiment travels. In FIG. 2A, the same configuration elements as in FIG. 1 are denoted by the same reference numerals, and description thereof will be omitted.

In the present exemplary embodiment, since a WBC type DDL oscillator is used as a laser oscillator, laser light 3 emitted from light source 1 is obtained by superimposing laser lights of a plurality of wavelengths $\lambda_1$, $\lambda_2$, $\lambda_3$, and $\lambda_4$. Wavelengths $\lambda_1$, $\lambda_2$, $\lambda_3$, and $\lambda_4$ are distributed in a state where the wavelengths are not superimposed, as illustrated in a distribution diagram of FIG. 2B. Laser light 3 emitted from the DDL oscillator includes laser lights of different wavelengths $\lambda_1$, $\lambda_2$, $\lambda_3$, and $\lambda_4$, which are coaxially superimposed and are emitted as integrated laser light 3. When laser light 3 is incident on AOM 21 in a state where a signal is input from AOM driver 22, diffraction occurs, and diffracted light 24 has a different diffraction angle depending on wavelengths. Diffracted light 24 gradually spreads due to difference in the diffraction angle for each wavelength. At this time, in AOM 21, not all incident laser light 3 is diffracted as diffracted light 24, and approximately 10% of laser light 3 transmits as zero-order light 23. Meanwhile, in AOM 21 in a state where no signal is input from AOM driver 22, diffraction does not occur, and all of laser light 3 transmits as zero-order light 23. In this way, since only zero-order light 23 is selectively picked up and used for processing, even when laser light 3 is condensed by a lens (not illustrated) or the like, laser lights of a plurality of wavelengths overlap each other without deviating from a spot. Accordingly, there is an advantage that satisfactory processing can be performed.

Figure 2B:
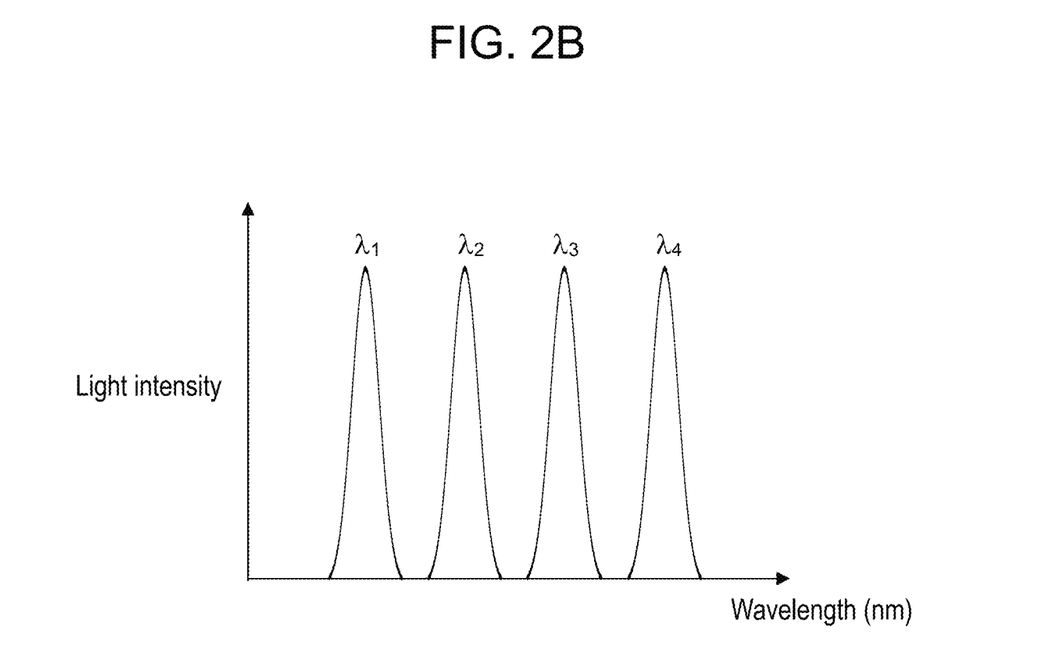
FIG. 2B is a diagram illustrating light intensity of the diffracted light according to the exemplary embodiment of the present disclosure.

In the present exemplary embodiment, wavelengths $\lambda_1$, $\lambda_2$, $\lambda_3$, and $\lambda_4$ are 975 nm, 980 nm, 985 nm, and 990 nm, respectively, but laser lights of two or more different wavelengths may be superimposed. A wavelength range at this time is preferably in a range of 300 nm or more and 2000 nm or less. For example, when a light source of blue close to 450 nm is used, laser processing can be performed with a high power.

Further, the laser processing apparatus has optical separation unit 5 provided on an optical path of laser light 3 passing through deflection unit 2. Optical separation unit 5 separates diffracted light 24 deflected by deflection unit 2 and zero-order light 23, blocks diffracted light 24 which is higher-order light, and causes only zero-order light 23 to transmit optical separation unit 5. Zero-order light 23 output from optical separation unit 5 is used for laser processing. That is, zero-order light 23 output from optical separation unit 5 is provided so as to face an object to be processed and is supplied to a processing head (not illustrated) that emits laser light.

Figure 3A:
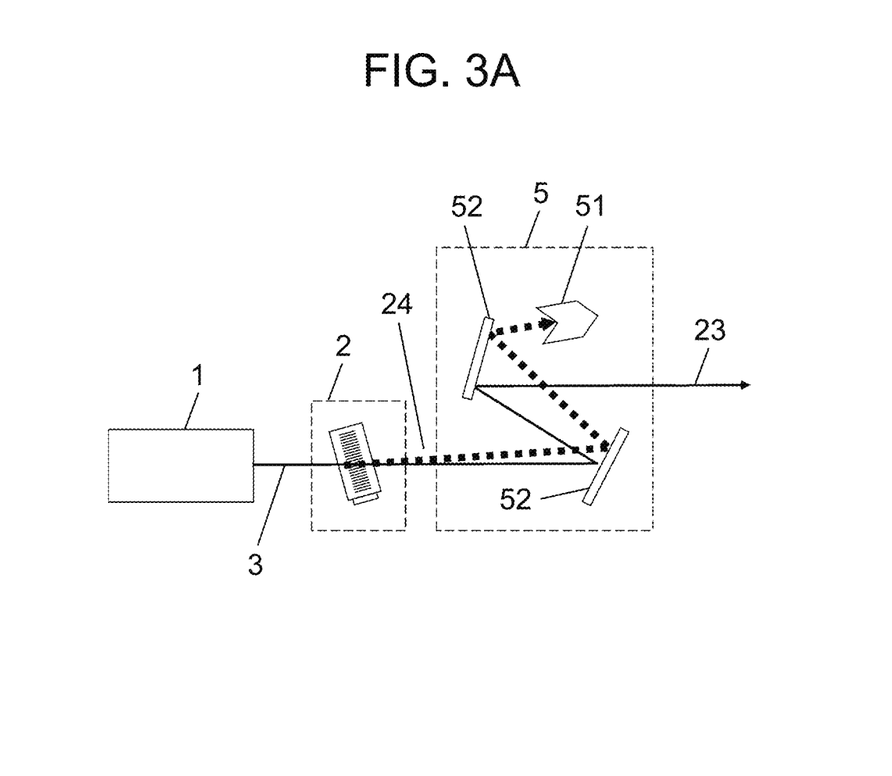
FIG. 3A is a schematic view of an optical separation unit according to an exemplary embodiment of the present disclosure.
Figure 3B:
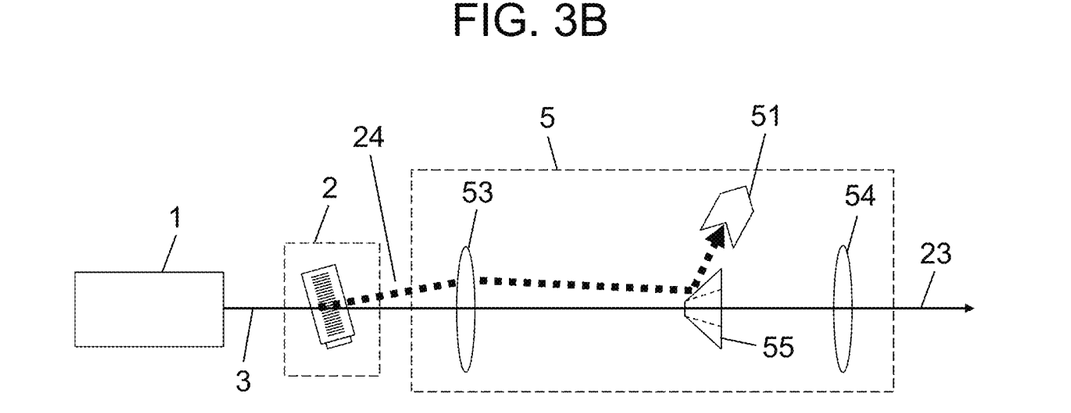
FIG. 3B is a schematic view of the optical separation unit according to the exemplary embodiment of the present disclosure.

FIGS. 3A and 3B illustrate schematic views of optical separation unit 5. In FIGS. 3A and 3B, the same configuration elements as in FIG. 1 are denoted by the same reference numerals, and description thereof will be omitted. FIG. 3A is an example of optical separation unit 5. Optical separation unit 5 preferably has a plurality of mirrors 52. Since mirror 52 folds an optical path by reflecting diffracted light 24 and zero-order light 23, a length of the optical path can be increased without increasing a size of optical separation unit 5 so much. Thereby, only diffracted light 24 is guided to damper 51 by gradually increasing a distance between diffracted light 24 and zero-order light 23. Optical separation unit 5 has damper 51, and damper 51 shields diffracted light 24 guided by mirror 52. By doing so, optical separation unit 5 causes only zero-order light 23 to transmit optical separation unit 5. In optical separation unit 5 illustrated in FIG. 3A, the number of mirrors 52 is set to 2, but multiple folding may be performed by using three or more mirrors 52.

FIG. 3B is another example of optical separation unit 5. Optical separation unit 5 illustrated in FIG. 3B includes lens 53, conical pinhole 55, lens 54, and damper 51. Zero-order light 23 and diffracted light 24 are condensed by lens 53, but a position of a condensing point of diffracted light 24 is a position different from a condensing point of zero-order light 23. Since conical pinhole 55 is disposed so that only zero-order light 23 transmits pinhole 55, zero-order light 23 transmitted pinhole 55 is returned to parallel light by lens 54, but diffracted light 24 is shielded toward damper 51. Lens 53 and lens 54 form a collimator, and a beam diameter of zero-order light 23 can be enlarged or reduced as necessary by appropriately setting a ratio between focal lengths of lens 53 and lens 54. Further, zero-order light 23 transmitted lens 54 is returned to parallel light, but depending on application, a distance between lens 53 and lens 54 may be adjusted to use zero-order light 23 as an enlarged beam or a reduced beam.

Since damper 51, mirror 52, and pinhole 55 receive high-power laser light, a cooling mechanism by water cooling or air cooling may be included therein.

Signal synchronization unit 4 controls a current supplied from power supply 1a to light source 1 in synchronization with a timing at which laser light 3 is deflected by optical element 21. In the present exemplary embodiment, signal synchronization unit 4 controls a timing at which a current is supplied to light source 1 (here, a laser oscillator) by inputting power supply modulation signal 41 to power supply 1a, and thereby, a timing at which laser light from light source 1 is oscillated is controlled. Further, signal synchronization unit 4 controls a timing at which zero-order light 23 transmits AOM 21 by inputting AOM driver modulation signal 42 to AOM driver 22.

Figure 4:
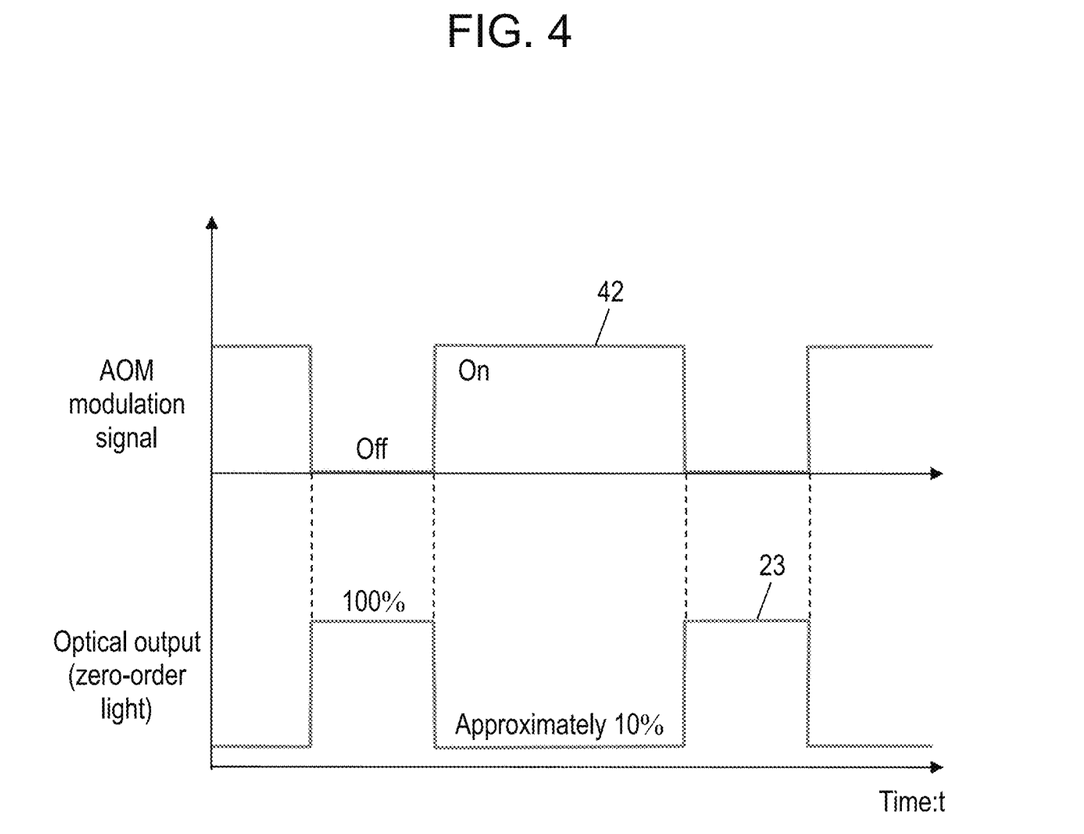
FIG. 4 is a diagram illustrating a waveform of an AOM modulation signal and a waveform of an optical output (zero-order light) when a pulse output of laser light is controlled only by the AOM modulation signal.

FIG. 4 is a diagram illustrating a waveform of AOM modulation signal 42 and a waveform of an optical output (zero-order light 23) when a pulse output of laser light is controlled only by AOM modulation signal 42. In FIG. 4, when AOM modulation signal 42 is turned on, AOM 21 functions as a diffraction grating, but AOM 21 causes all light to transmit AOM 21 as zero-order light 23 without diffracting all the light. At this time, zero-order light 23 that transmits optical separation unit 5 and is output is approximately 10%. When AOM modulation signal 42 is turned off, AOM 21 does not function as a diffraction grating, and thus, zero-order light 23 transmits optical separation unit 5 and has an optical output of approximately 100%.

That is, when the light output is controlled as illustrated in FIG. 4, when a laser oscillator having an output of 1000 W is used as the laser oscillator of light source 1, laser light of approximately 100 W of 10% is output even when the pulse is turned off. Therefore, in the optical output control, an object to be processed is likely to be damaged by influence of heat or the object to be processed is likely to be deformed during processing.

From this point of view, in the optical output control according to the present exemplary embodiment, a pulse output of the laser light is controlled by coordinating AOM modulation signal 42 and power supply modulation signal 41.

Figure 5:
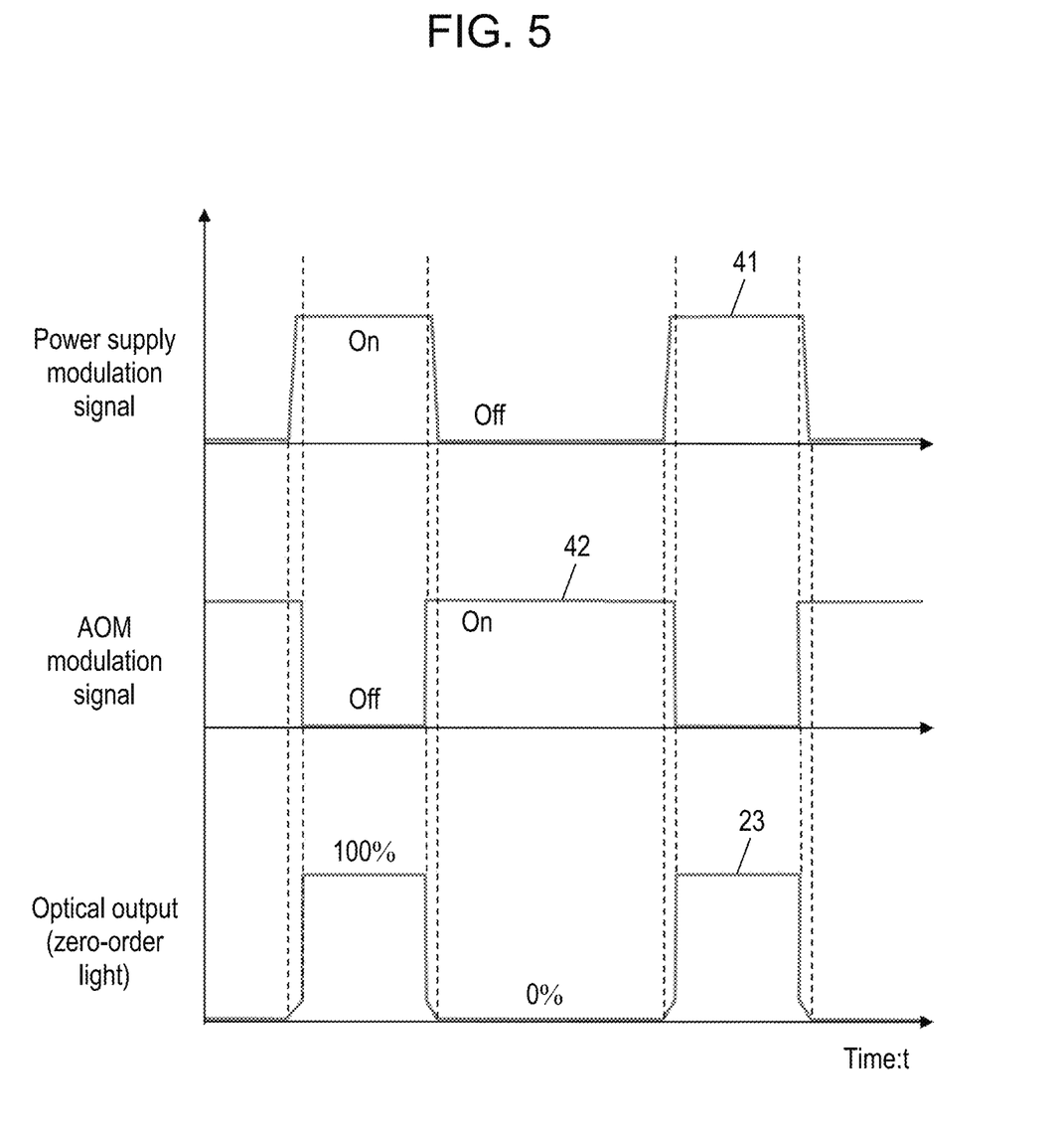
FIG. 5 is a diagram illustrating the waveform of the AOM modulation signal, a waveform of a power supply modulation signal, and the waveform of the optical output (zero-order light) in an optical output control according to the exemplary embodiment of the present disclosure.

FIG. 5 is a diagram illustrating a waveform of AOM modulation signal 42, a waveform of power supply modulation signal 41, and a waveform of an optical output (zero-order light 23) in the optical output control according to the present exemplary embodiment.

As illustrated in FIG. 4, when the laser light is pulsed only by AOM modulation signal 42, an optical output does not become 0% even when AOM modulation signal 42 is turned on, but in the optical output control according to the present exemplary embodiment, as illustrated in FIG. 5, power supply modulation signal 41 is turned off at the timing at which AOM modulation signal 42 is turned on. Accordingly, a light output of zero-order light 23 can be suppressed to 0% at the timing at which the laser light is not output.

In the optical output control according to the present exemplary embodiment, rising and falling of a pulse output of the laser light are controlled by a modulation timing of AOM 21. Accordingly, it is possible to realize the rising and falling of the pulse output of the laser light at a time of approximately 400 ns. Thereby, it is possible to further increase processing accuracy by laser light.

When the rising and falling of the pulse output of the laser light is controlled by a general power supply modulation, a rising time and a falling time of the pulse output of the laser light is several tens of microseconds. Therefore, in the optical output control according to the present exemplary embodiment, the rising time and the falling time of the pulse output of the laser light can be set to be less than or equal to 1/10 as compared with a case of controlling the rising and falling of the pulse output of the laser light by the general power supply modulation.

Specifically, in the optical output control according to the present exemplary embodiment, when controlling the rising of the pulse output of the laser light, a delay time from rising start of power supply modulation signal 41 from turn-off to turn-on to falling start of AOM modulation signal 42 from turn-on to turn-off is configured to secure at least 10 μs or more, more preferably, 50 μs or more. For example, 500 μs is set as an upper limit of the delay time. That is, in the optical output control according to the present exemplary embodiment, transmission of the laser light by AOM 21 is in an on state after 10 μs or more elapses from rising of a current of power supply 1a. Accordingly, the rising time of the pulse output of the laser light is rate-limited by AOM 21, and thereby, it is possible to realize rising on the order of nanoseconds.

At this time, if power supply modulation signal 41 is switched from turn-off to turn-on and AOM modulation signal 42 is switched from turn-on to turn-off at the same time, rising of power supply modulation signal 41 is rate-limited on the order of microseconds, and rising of the pulse output of the laser light is rate-limited on the order of microseconds.

Further, in the optical output control according to the present exemplary embodiment, when falling of the pulse output of the laser light is controlled, after a rising start point of AOM modulation signal 42 from turn-off to turn-on, power supply modulation signal 41 is set such that falling from turn-on to turn-off starts. That is, in the optical output control according to the present exemplary embodiment, before a current of power supply 1a falls, transmission of laser light 3 by AOM 21 is in an off state. Accordingly, a falling time of the pulse output of the laser light is rate-limited to AOM modulation signal 42, and thereby, it is possible to realize falling on the order of nanoseconds.

Figure 6:
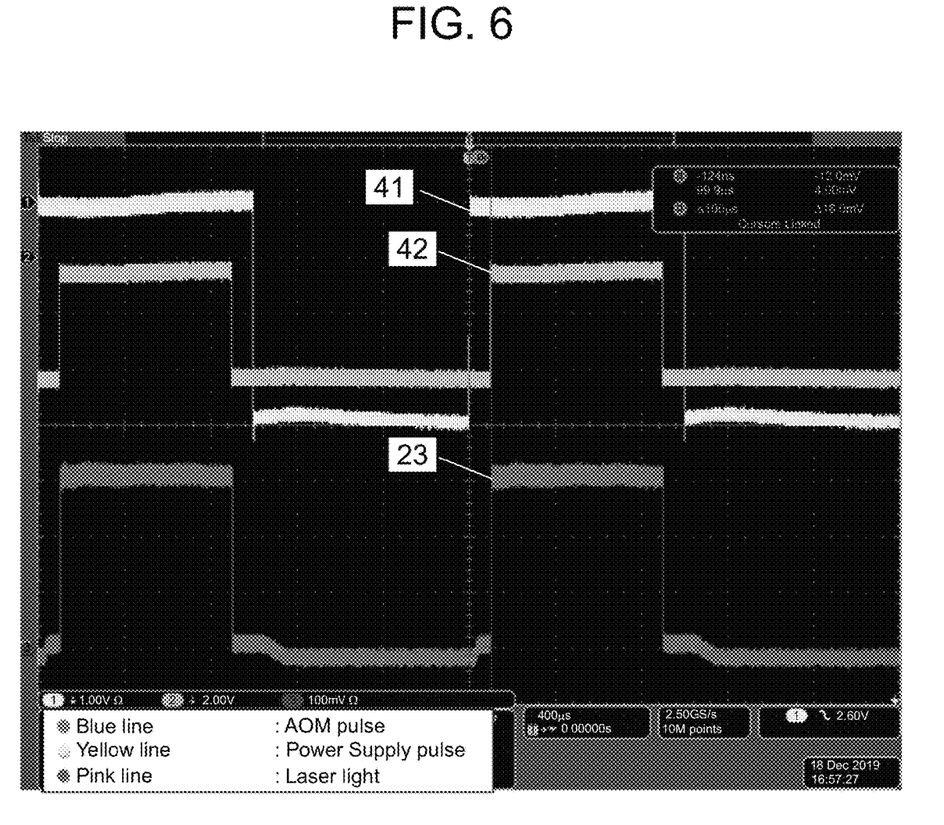
FIG. 6 is a diagram illustrating an oscilloscope observation result of the waveform of the AOM modulation signal, the waveform of the power supply modulation signal, and the waveform of the optical output (zero-order light) in the optical output control according to the exemplary embodiment of the present disclosure.

FIG. 6 is a diagram illustrating an oscilloscope observation result of a waveform of AOM modulation signal 42, a waveform of power supply modulation signal 41, and a waveform of an optical output (zero-order light 23) in the optical output control according to the present exemplary embodiment. In FIG. 6, a horizontal axis is 400 μs/Div, and a vertical axis illustrates the waveforms of power supply modulation signal 41, AOM modulation signal 42, and the optical output. In FIG. 6, a delay time from rising of power supply modulation signal 41 to rising of AOM modulation signal 42 is set to 100 μs. Further, as for falling, a delay time of 100 μs is set from a falling timing of AOM modulation signal 42 to the rising of power supply modulation signal 41.

As illustrated in FIG. 6, it can be seen that the waveform of zero-order light 23 can rise and fall at approximately 400 ns. Further, it can be seen that a pulse in which an output of zero-order light 23 is 0% can be generated except for a short period before and after the zero-order light 23 is output.

As described above, according to the laser processing apparatus of the present exemplary embodiment, a waveform of laser light can be controlled with high accuracy, and thus, it is possible to realize high processing accuracy. Further, accordingly, it is possible to suppress current loss and reduction in efficiency during rising and falling of an optical output.

In the laser processing apparatus according to the present exemplary embodiment, for example, a pulse duty during a pulse operation can be set to be greater than or equal to 1% and less than or equal to 50%.

Further, in the laser processing apparatus according to the present exemplary embodiment, when power supply 1a having fast rising and falling response times is used, a delay time can be set to be small, and thus, the delay time may be set, for example, 10 µs.

Further, in the laser processing apparatus according to the present exemplary embodiment, when considering responses of power supply modulation signal 41 and AOM modulation signal 42, a repetition frequency of a pulse is preferably in a range of a continuous wave (CW) or higher and 50 kHz or lower.

Since a laser processing apparatus according to the present disclosure has excellent processing accuracy, the laser processing apparatus can be applied to processing of various materials such as resins and metals.

What is claimed is:

1. A laser processing apparatus comprising:
    a light source including a laser oscillator that is configured to emit laser light;
    a power supply that is configured to supply a current to the light source;
    a deflection unit that is positioned on an optical path of the laser light emitted from the light source, the deflection unit including: (i) an acousto-optic element (AOM) that is configured to change an amount of transmission of the laser light to deflect at least a part of the laser light; and (ii) and an AOM driver that is configured to input a signal into the AOM;
    an optical separation unit that is positioned on the optical path of the laser light passing through the deflection unit, configured to shield higher-order light that is included in the laser light and deflected by the AOM in the deflection unit, and configured to transmit zero-order light that is included in the laser light and passes through the deflection unit; and
    a signal synchronization circuit that is configured to: (i) control the power supply to selectively turn the current off in synchronization with a timing at which both the higher-order light and the zero-order light are deflected by the AOM; (ii) input a power supply modulation signal to the power supply; and (iii) input an AOM driver modulation signal to the AOM driver,
    wherein the optical separation unit includes a mirror configured to reflect both the higher-order light and the zero-order light, and a damper configured to shield the higher-order light.

2. The laser processing apparatus of claim 1, wherein:
    the current is a pulse current; and
    the signal synchronization circuit is configured to control the power supply to turn the current off at a timing at which a passing amount of the zero-order light in the deflection unit is at a minimum.

3. The laser processing apparatus of claim 2,
    wherein a repetition frequency of a pulse of the pulse current is in a range of a continuous wave (CW) or higher and 50 kHz or lower.

4. The laser processing apparatus of claim 2,
    wherein the light source is configured to output laser light having a pulse duty in a range of 1% or greater and 50% or less.

5. The laser processing apparatus of claim 1,
    wherein the laser oscillator is configured to emit laser light in which two or more different wavelengths are superimposed.

6. The laser processing apparatus of claim 1,
    wherein the laser oscillator is a wavelength beam combining (WBC) direct diode laser (DDL) oscillator.

7. The laser processing apparatus of claim 1,
    wherein a wavelength of the laser light is in a range of 300 nm or greater and 2000 nm or less.

8. The laser processing apparatus of claim 1,
    wherein the signal synchronization circuit is configured to cause transmission of the laser light by the AOM to be turned on after 10 µs or more elapses from rising of the current.

9. The laser processing apparatus of claim 1,
    wherein the signal synchronization circuit is configured to cause transmission of the laser light by the AOM to be in an off state before falling of the current.

10. The laser processing apparatus of claim 1,
    wherein the laser processing apparatus is configured to process an object by the zero-order light that is included in the laser light and passes through the optical separation unit.

11. A laser processing method using the laser processing apparatus of claim 1, the laser processing method comprising:
    processing an object by the zero-order light that is included in the laser light and passes through the optical separation unit.

12. The laser processing apparatus of claim 1, wherein:
    the mirror is one of a plurality of mirrors;
    the optical separation unit is configured to fold the optical path by reflecting the higher-order light and the zero-order light; and
    the optical separation unit is configured to increase a distance between the higher-order light and the zero-order light by increasing an optical path length in the optical separation unit so as to allow separation of the higher-order light and the zero-order light.

13. A laser processing apparatus comprising:
    a light source including a laser oscillator that is configured to emit laser light;
    a power supply that is configured to supply a current to the light source;
    a deflection unit that is positioned on an optical path of the laser light emitted from the light source, the deflection unit including: (i) an acousto-optic element (AOM) that is configured to change an amount of transmission of the laser light; and (ii) an AOM driver that is configured to input a signal to the AOM;
    an optical separation unit that is positioned on the optical path of the laser light passing through the deflection unit, configured to shield higher-order light that is deflected by the deflection unit, and configured to transmit zero-order light; and
    a signal synchronization circuit that is configured to: (i) control the power supply to selectively turn the current off in synchronization with a timing at which both the higher-order light and the zero-order light are deflected by the AOM; (ii) input a power supply modulation signal to the power supply; and (iii) input an AOM driver modulation signal to the AOM driver, wherein the optical separation unit includes a first lens, a conical pinhole, a second lens, and a damper configured to shield the higher-order light, the conical pinhole being at a condensing point of both the higher-order light and the zero-order light by the first lens and being configured to transmit the zero-order light.

\* \* \* \* \*